L. Fay,
Seaming Sheet-Metal.
No. 889. Reissued Jan 24, 1860.
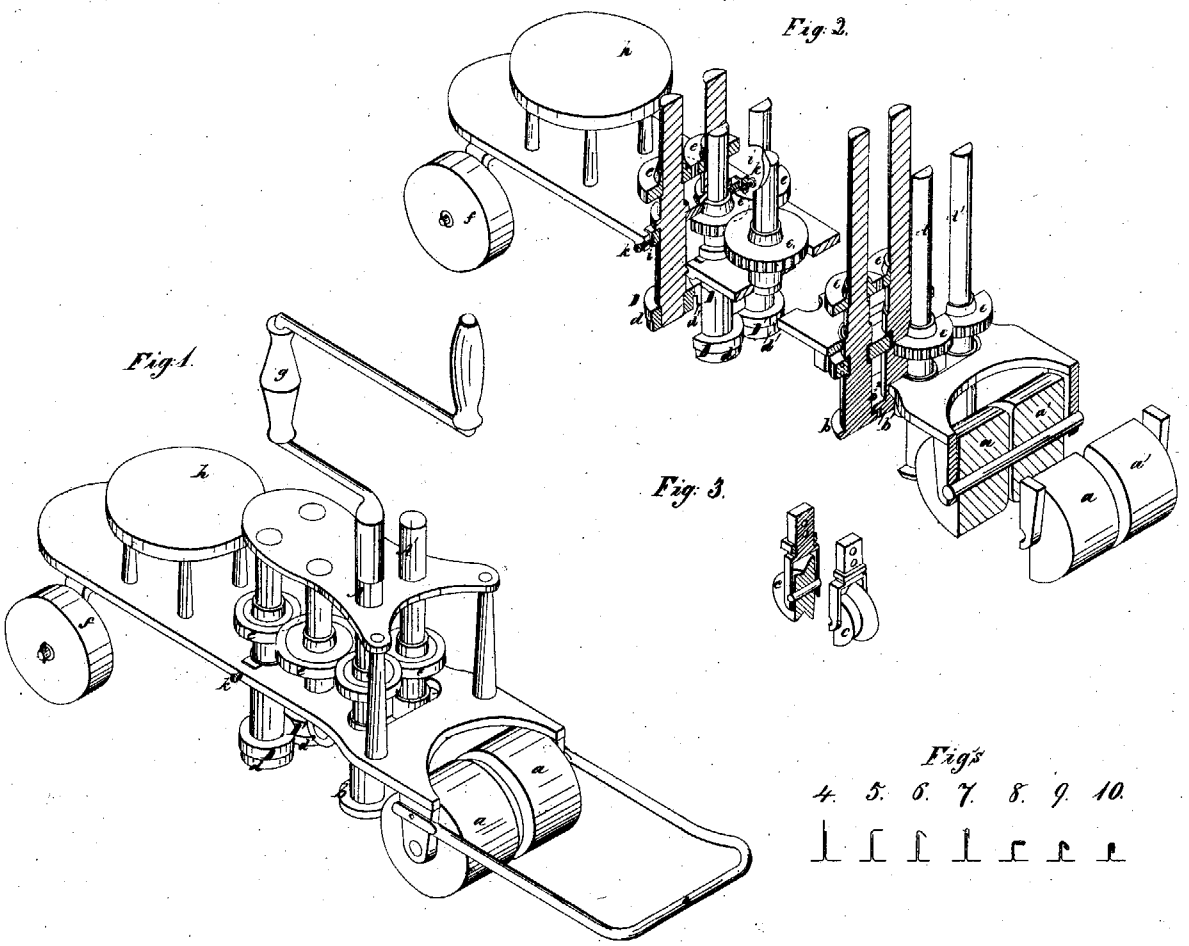
N. PETERS, PHOTO-LITHOGRAPHER, WASHINGTON, D. C.

UNITED STATES PATENT OFFICE.

LUCIAN FAY, OF CINCINNATI, OHIO.

IMPROVED MACHINE FOR SEAMING SHEET-METAL ROOFS.

Specification forming part of Letters Patent No. 17,874, dated July 28, 1857; Reissue No. 889, dated January 24, 1860.

*To all whom it may concern:*

Be it known that I, LUCIAN FAY, of Cincinnati, Hamilton county, Ohio, have invented a certain new and useful Machine for Seaming Sheet-Metal Roofs; and I hereby declare the following to be a full, clear, and exact description of the construction and operation of the same, reference being had to the accompanying drawings, making part of this specification.

This invention relates to an arrangement of seaming mechanism mounted in a carriage, and operating automatically to form the standing seams of sheet-metal roofs.

In the accompanying drawings, Figure 1 is a perspective view of a machine illustrating my invention. Fig. 2 represents the same in section. Fig. 3 is an enlarged view of the folding-roller. Figs. 4 to 10, inclusive, are diagrams illustrating the successive stages of single and double seaming.

B is a carriage bed or frame, supported behind on two widely-separated wheels, *f*, and at its extreme front on "pioneer" rollers *a a'*, which play loosely on their axle, and are just so much less than it in their aggregate length as to admit between their adjacent ends the upturned flanges of the standing joint about to be seamed. (See Fig. 3.) Two vertical shafts, A A', have attached at their lower extremities upsetting or "burring" rollers *b b'*, consisting of two short conic frustra, of which one, *b*, is inverted, and the other, *b'*, has a flange, $b^2$, which projects over the upper or salient edge of *b*. These rollers co-operate to turn over or "upset" the first fold or "burr" at right angles to its original position. (See Fig. 4.) The "folding" roller *c* revolves in a vertical plane, and has a V-shaped groove around its periphery. The roller *c*, being situated immediately in rear of the burring-rollers, turns down or folds the edge of the metal from a right to an acute angle (see Fig. 5) preparatory to the action of the seaming-rollers. The seaming or closing rollers D *d* D' *d'* are of cylindrical form and revolve in a common horizontal plane. The upper portions, D D', of these rollers are of slightly greater diameter than the lower portions, *d d'*, so that the upper parts of their peripheries are nearly or quite in contact, while a space intervenes below. Both of the seaming-rollers D *d* D' *d'* are made to press with equal force toward the central or working line of the machine by means of set-screws *k k'* and gum or other springs, *l l'*. A crank, *g*, and gearing *e* enable the simultaneous rotation and propulsion of the operative mechanism *a a' b b' c* D *d* D' *d'* by the operator. A seat, *h*, for the operator is conveniently located at the rear part of the carriage. A stirrup, *i*, projects in front of the carriage to such a distance and position as to afford a suitable footing for the operator.

Operation: The sheets being laid on the roof in the customary manner—namely, cross-seamed together in strips which extend in parallel tiers from ridge to eave, and having their upturned or flanged portions contiguous to each other, (one flange being lower than the other by the breadth of a fold,) and being secured to the sheathing-boards by the customary cleats—the machine is taken to the ridge of the roof, and is presented toward the eave, with the pioneer rollers *a a'* astride of the pair of upturned edges which compose a standing joint. The machine is then allowed to travel down the joint (see Fig. 4) until the engagement of the burring-rollers *b b'*. The operator now takes his seat and, placing his feet in the stirrup, turns the crank *g*, so as to cause the rollers *b b'* to propel or draw the machine forward, and at the same time to turn the higher flange of the joint over to a right angle. (See Fig. 5.) The folding-roller *c* then taking effect bends the burr down to an acute angle, (see Fig. 6,) and thus prepares it for the action of the seaming-rollers, between the upper or close portions, D D', of which it next passes, and is by them folded flat against the face of the lower flange, making at one operation a complete single seam. (See Fig. 7.) The pioneer rollers, being situated somewhat in advance of the seaming mechanism proper, act very effectively to guide and steady the machine. They also prepare the joint for the action of the seaming mechanism by drawing the two flanges closely together, restoring and holding them to a vertical position, straightening kinky and uneven places, and pressing the sheets of metal flatly and snugly down upon the sheathing-boards of the roof, so as to bring the summits of the flanges exactly parallel and equidistant throughout their length, in order to produce a smooth and uniform and even seam parallel with the pitch of the roof. For double seaming, the rollers *b b′ c* are lowered by means of shifting-keys, as shown, or other familiar shifting appliance, so as to bring their working-line on a level with the lower portions, *d d′*, of the seaming-rollers, and the successive stages of double seaming (see Figs. 8, 9, 10) are produced by a precise repetition of the movements above described for single seaming.

The apparatus is adapted for seaming to the right or to the left by simply transposing the rollers *b b′*, as the roller *c* may be so grooved as to serve equally for the right or left.

The forms and arrangement of parts of the present illustration were selected as being those which actual test had proved effective; but others might manifestly be employed without departing from the essential characteristics of the invention. For example, the adjustment for single and double seaming may be a simultaneous movement effected by a lever and sliding frame, such as commonly employed for shifting shafts, clutch-boxes, &c.; or the machine may be adapted for completely single and double seaming at one operation by providing a suit of double-seaming rollers in the rear of the others. The burring rollers may have a precisely (in place of an approximately) cylindrical form. Two obliquely-set rollers, or even a single notched tongue, may replace the roller *c*. The pioneer rollers may be omitted, as the machine would work (though less perfectly) without them. The entire operative mechanism or parts immediately concerned in making the seam may be provided with yielding bearings, such as described for the seaming-rollers. The burring and seaming operations may be performed in separate carriages, the folding-roller being applied either in the rear of the burring or in front of the seaming rollers.

Among the beneficial features of this invention are the following: An automatic machine is provided with which a boy or unskilled laborer is enabled to make the standing seam of a sheet-metal roof of superior quality to the best skilled wormanship and in one-tenth part of the time. The sphere of action of the machine is the roof itself, the upturned edges of the metal being sufficient guide. A complete (single or double) standing seam is made by a single continuous motion of the machine. A uniform action of the seaming mechanism is maintained along the entire joint, both at cross-seams and elsewhere. The same apparatus serves both for single and for double seaming. The machine, being adapted to carry the operator, is easily operated, and is effectually held down to its work without permanent addition to its weight, which is so slight that the machine can be easily carried about in one hand. The mode of supporting the feet of the operator gives him perfect control of the machine and prevents it riding up in front.

I claim as new and of my invention herein and desire to secure by Letters Patent—

1. A suit of seaming-rollers mounted in a carriage and operating by the described continuous movement to produce a standing seam of even height on stationary sheets of metal.

2. Adapting a seaming-carriage, substantially in the manner set forth, to produce a standing seam without other guide than the upturned edges upon which it operates.

3. In the described combination with the seaming mechanism, the pioneer rollers *a a′*, operating in the manner and for the purposes set forth.

4. The described arrangement and application of a folding-roller, *c*, operating to turn or fold the edge of the metal from a right to an acute angle preparatory to the action of the seaming or closing rollers, as set forth.

5. The burring, folding, and seaming rollers, constructed, arranged, and operating substantially as set forth, to complete a single or double standing seam at one operation.

6. Arranging the seaming-rollers against yielding bearings, substantially as and for the purpose set forth.

7. Making the operative mechanism of a seaming carriage adjustable in height for the successive operations of a single and double seaming, as set forth.

8. The operator's seat applied to a seaming-carriage, substantially as and for the purposes set forth.

9. The stirrup *i*, constructed and applied substantially as and for the purposes set forth.

In testimony of which invention I hereunto set my hand.

LUCIAN FAY.

Witnesses:
GEO. H. KNIGHT,
C. STEEMER, Jr.